W. H. RAULZ.
ATTACHMENT FOR PLANTERS.
APPLICATION FILED JUNE 7, 1917.

1,242,591.

Patented Oct. 9, 1917.

Inventor
W. H. RAULZ

By N. S. Heal
Attorney

UNITED STATES PATENT OFFICE.

WILLIE H. RAULZ, OF HYE, TEXAS.

ATTACHMENT FOR PLANTERS.

1,242,591. Specification of Letters Patent. Patented Oct. 9, 1917.

Application filed June 7, 1917. Serial No. 173,304.

*To all whom it may concern:*

Be it known that I, WILLIE H. RAULZ, a citizen of the United States, residing at Hye, in the county of Blanco, State of Texas, have invented a new and useful Attachment for Planters; and I do hereby declare the following to be a full, clear, and exact description of the invention, such as will enable others skilled in the art to which it appertains to make and use the same.

The present invention relates to certain improvements in planters, such as are commonly employed for planting cotton and corn fields, the object of the invention being to provide a device of this character which embodies novel features of construction whereby the runner is yieldably mounted and held firmly in position by the action of a spring, although it can spring upwardly if a large stone or other unyielding object is encountered.

Further objects of the invention are to provide a runner mounting for planters which is comparatively simple and inexpensive in its construction, which can be used in connection with the conventional planting machines, which can be adjusted to regulate the spring pressure of the runner against the bottom of the furrow, and which is not liable to break or get out of repair.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawings, in which:—

Corresponding and like parts are referred to in the following description and indicated in all the views of the drawings by the same reference characters.

Figure 1:
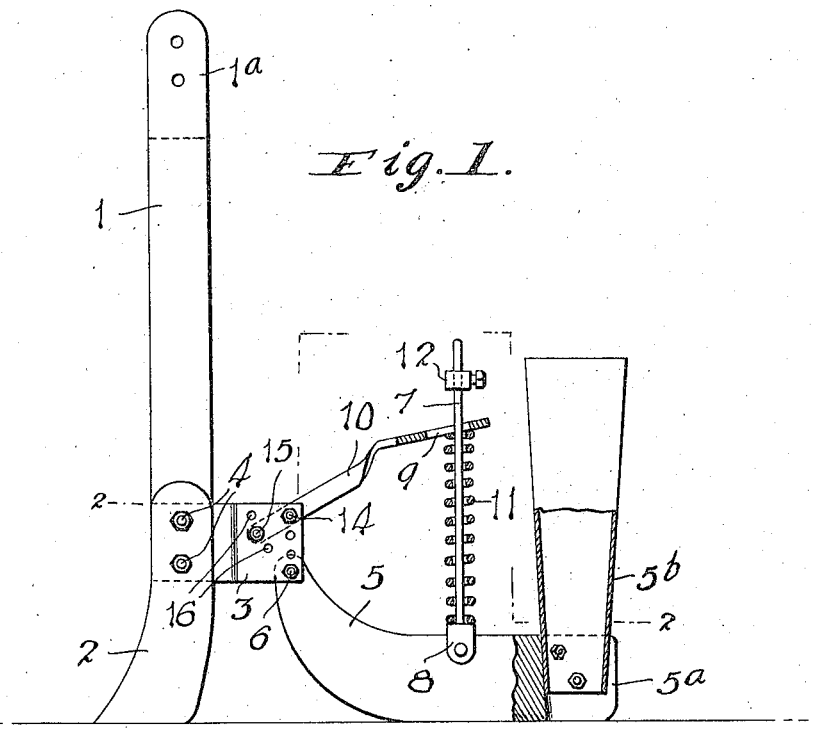
Figure 1 is a side elevation of an attachment for planters constructed in accordance with the invention, portions being broken away and shown in section.
Figure 2:
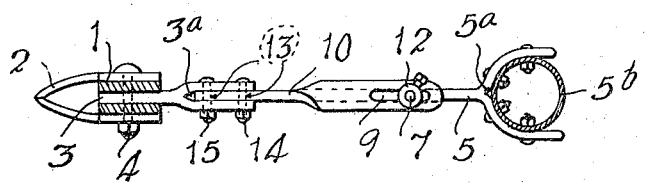
Fig. 2 is a horizontal sectional view taken on the line 2—2 of Fig. 1.

Referring to the drawings, which illustrate one embodiment of the invention, the numeral 1 designates a conventional standard of which the lower end is bifurcated, the upper end 1ª thereof being adapted to be attached to the frame of a conventional planting mechanism. A furrow opener 2 is fitted rigidly upon the lower end of the standard 1, being preferably constructed to straddle the standard and be secured to the outside thereof. A vertically disposed plate 3 has the forward edge thereof received within the bifurcated lower end of the standard and rigidly secured in position therein by suitable fastening members 4. This plate projects rearwardly from the standard, and the rear edge thereof is bifurcated at 3ª for the reception of the forward end of the runner 5. This runner is pivotally connected at 6 to the plate 3, said runner being adapted to travel in the furrow opened by the member 2, and having the rear end thereof bifurcated at 5ª and provided with the usual boot 5ᵇ through which the seed to be planted are dropped in the furrow at proper intervals by some conventional seed dropping mechanism.

A plunger 7 extends upwardly from an intermediate portion of the runner 5, being pivotally connected to the upper edge of the runner by a suitable clip 8. The upper end of the plunger slides through a slightly elongated guide opening 9 in the rear end of a bracket arm 10 which is adjustably secured to the plate 3. A coil spring 11 surrounds the plunger or rod 7 and is interposed between the runner 5 and the bracket arm 10 so that the tension of the spring serves to hold the runner in a yielding engagement with the bottom of the furrow. A set collar 12 may be applied to the plunger rod 7 above the bracket arm 8 for engagement with the bracket arm to limit the downward swinging movement of the runner.

The bracket arm 10 is preferably adjustably connected to the plate 3 so that it can be set at different angles, thereby regulating the tension in the spring 11. For this purpose the forward end of the bracket arm 10 may be provided with a pair of spaced openings 13, one of which is engaged by a pivot bolt 14, while the other opening is engaged by a clamping bolt 15 adapted to be inserted through any selected one of a series of openings 16 in the plate 3. By thus setting the bracket arm at different angles the tension of the spring 11 can be increased or decreased, as may be desired, depending upon the depth of the furrow and the character of soil being operated upon. The planter is used in the conventional manner, the opener 2 forming a furrow as the machine is advanced across the field, while the runner 5 travels in the bottom of the furrow so that seed falling through the boot 5ᵇ from the seed dropping mechanism will be properly deposited in the furrow at the required intervals.

Having thus described the invention, what I claim as new and desire to secure by Letters Patent, is:—

A device of the character described including a standard having a bifurcated lower end, a furrow opener applied to the bottom of the standard and straddling the same, a vertically disposed plate having the forward edge thereof secured within the bifurcated lower end of the standard, the rearwardly projecting edge of the plate being bifurcated, a runner pivotally mounted within the bifurcated rear edge of the plate and arranged to trail the furrow opener, a plunger rod pivotally connected to the runner and extending upwardly therefrom, a guide bracket slidably engaging the plunger rod and having the forward end thereof adjustably received within the bifurcated rear edge of the plate, said guide bracket being constructed to be secured to the plate in different angular relations thereto, and a coil spring surrounding the plunger rod and interposed between the runner and the guide bracket for holding the runner in a yielding engagement with the bottom of the furrow, the tension of the spring being regulated by adjusting the angular position of the guide bracket.

In testimony whereof I have signed my name to this specification in the presence of two subscribing witnesses.

WILLIE H. RAULZ.

Witnesses:
H. G. BROWN,
J. S. BROWN.

Copies of this patent may be obtained for five cents each, by addressing the "Commissioner of Patents, Washington, D. C."